May 8, 1928.
F. C. D. WILKES ET AL
1,669,272
CONVEYER CHAIN GUIDE FOR SUGAR CANE HARVESTERS
Filed March 27, 1922   3 Sheets-Sheet 1
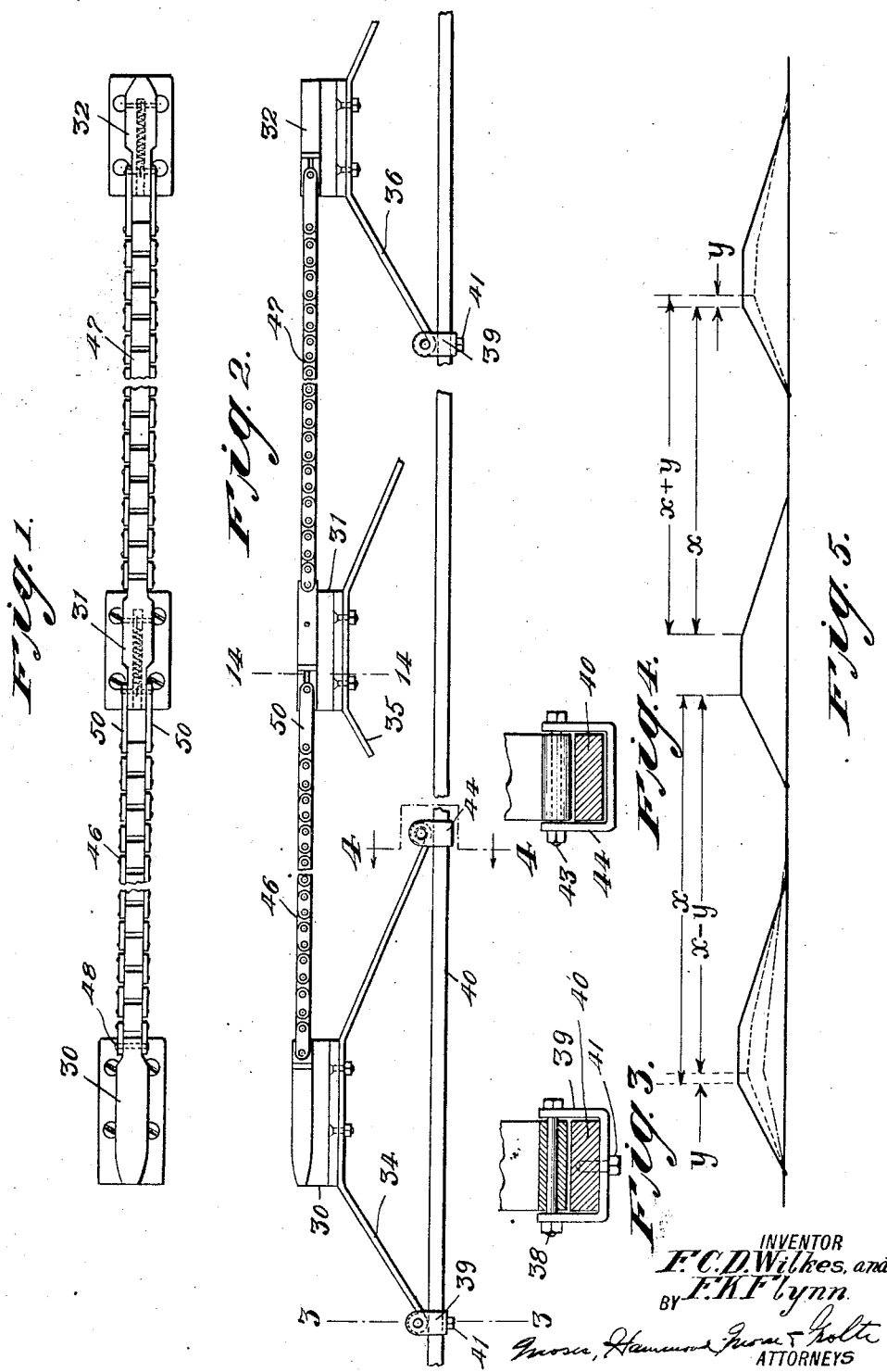
INVENTOR
F.C.D.Wilkes, and
BY F.K.Flynn.
ATTORNEYS

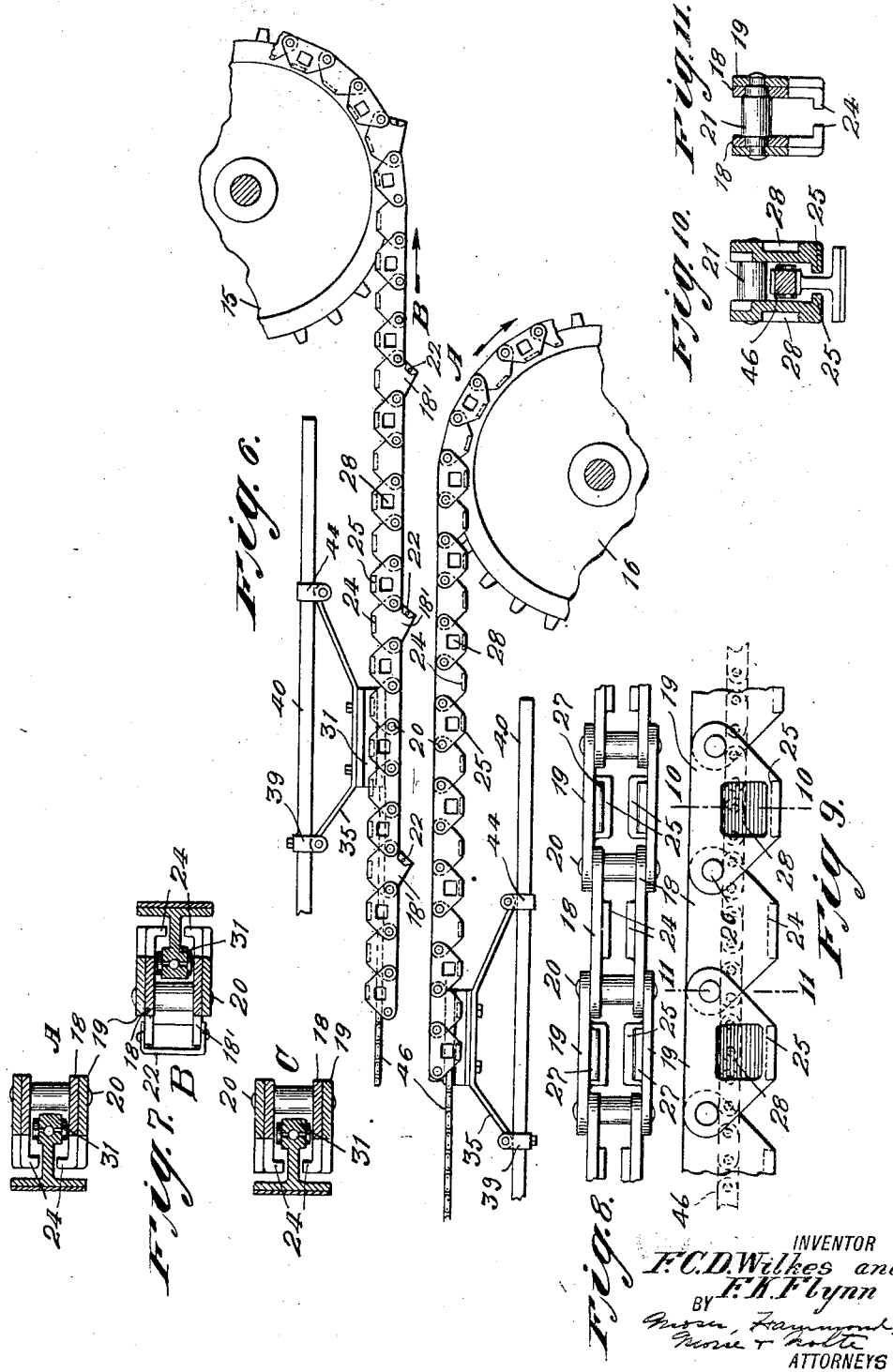

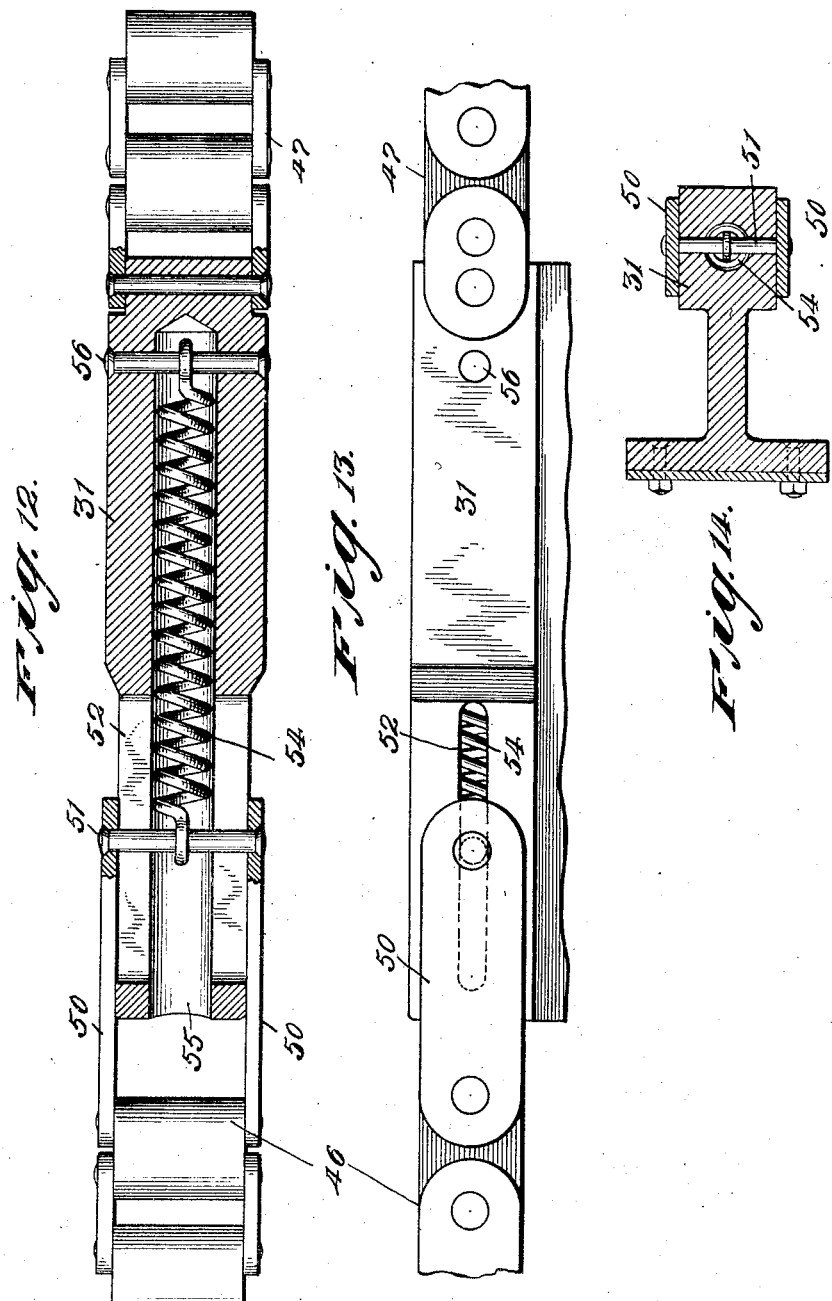

Patented May 8, 1928.

1,669,272

UNITED STATES PATENT OFFICE.

FREDERICK C. DOUGLAS WILKES AND FRANCIS K. FLYNN, OF NEW YORK, N. Y., ASSIGNORS TO LUCE CANE HARVESTER CORPORATION, OF NEW YORK, N. Y., A CORPORATION OF DELAWARE.

CONVEYER-CHAIN GUIDE FOR SUGAR-CANE HARVESTERS.

Application filed March 27, 1922. Serial No. 547,268.

This invention relates to conveyer chain guides and is particularly useful in connection with conveyer chains used in sugar cane harvesters and similar machinery. It may be considered as an improvement upon the conveyer chain guide described and claimed in our prior application Serial No. 320,696, filed August 29, 1919, now Patent 1,429,991, Sept. 26, 1922.

The general object of the present invention is to provide improved yielding guide means for conveyer chains which will exert its guiding function continuously throughout that portion of the path of the conveyer chain in which yielding guiding is particularly necessary. In the guiding means of our prior application above mentioned, separate yieldingly supported guide blocks are provided; whereas by the present invention yieldingly supported guide blocks are connected by a flexible and extensible guide member, whereby there is provided a continuous but locally yielding guiding means which is preferably interlocked with the conveyer chain. One of the advantages of the present invention resides in the fact that the conveyer chains which carry the sugar cane through the harvester are supported throughout that portion in which great strains tend to force the chains out of their proper paths.

The invention will be understood from the following description, taken in connection with the accompanying drawings, in which Figure 1 is a side elevation and Figure 2 is a plan view, certain parts being broken away, showing our improved guiding means; Figure 3 is a sectional elevation on the line 3—3 of Figure 2; Figure 4 is a sectional elevation on the line 4—4 of Figure 2; Figure 5 is a diagram illustrating the lengthening and contracting of the guide chain which occurs when the guiding means is in use; Figure 6 is a fragmentary plan view showing portions of co-acting conveyer chains co-operating with our improved guiding means; Figure 7 is a sectional elevation thru conveyer chains and guide blocks illustrating how three conveyer chains may be advantageously arranged in co-operative relation; Figure 8 is an elevation and Figure 9 is a plan of a portion of one of the conveyer chains illustrated in Figures 6 and 7; Figure 10 is a sectional elevation on the line 10—10 of Figure 9; Figure 11 is a sectional elevation on the line 11—11 of Figure 9; Figure 12 is an elevation partly in section showing the manner in which the guide chains are attached to a guide block; Figure 13 is a plan view of the structure shown in Figure 12; and Figure 14 is a sectional elevation on the line 14—14 of Figure 2.

Referring to the drawings, the conveyer chains in connection with which the present invention is illustrated and described are shown in Figures 6 to 11. These conveyer chains A, B and C are of a type adapted to grip stalks of sugar cane and convey them through a harvesting machine; the relative arrangement of the chains being as shown in Figure 7. In Figure 6, the chain B is shown as running over a sprocket 15, and the chain A as running over a sprocket 16, it being understood that other sprockets not shown cooperate with the conveyer chains at other points. Each conveyer chain, A, B and C comprises inner links 18 and outer links 19 pivotally connected together by rivets 20 the enlarged middle portions 21 of which serve to space apart the inner links 18. The chains A and C are alike, but the chain B is preferably provided at intervals with inner links 18', of the form best shown in Figure 6, to the forwardly inclined faces of which are attached cover plates 22, thereby providing the chain B with projections which engage the cane and prevent it from slipping backward between the conveyer chains. Both the inner and the outer links 18, 18' and 19 have backwardly extending portions, and these portions of the inner links 18 and 18' are provided with inwardly projecting ears 24, while the outer links 19 have similar but longer inwardly projecting ears 25. The inner ends of the ears 24 and 25 are substantially in line with one another, and these ears serve to interlock the conveyer chains with the chain guiding means hereinafter described. The outer links 19 are provided on their insides with lugs 27 the inner surfaces of which lie substantially in the planes of the inner surfaces of the inner links 18. The lugs 27 may be attached to the inner surfaces of the links 19, but are preferably formed integral with the links 19 which in their outer surfaces may be provided with depressions 28 for the sake of lightness and economy of material. The inner surfaces of the lugs 27 and the inner surfaces of the links 18 co-operate with the conveyer guiding means hereinafter described.

The guiding means which yieldingly hold the conveyer chains A, B and C in co-operative engagement with the cane passing through the machine, comprise a plurality of yieldingly supported guide blocks, three being shown for purposes of illustration, connected by guide chains. These guide blocks 30, 31 and 32 are mounted on flat springs 34, 35 and 36 of the form shown. At their forward ends, each of these springs is bent up to form an eye through which is passed a bolt 38 extending through holes in a yoke 39 adapted to surround the frame bar 40 and to be secured against movement thereon by a screw bolt 41. At their rear ends, each of said springs is also formed into an eye through which is passed a bolt 43 extending through holes in a yoke 44 surrounding and slidable upon the frame bar 40. Each of the springs 34, 35 and 36 is preferably made with the rear inclined portion somewhat longer than the forward inclined portion, thereby causing the rear ends of the guide blocks to move under pressure toward the frame bar 40 further than the forward ends do. This decreases the tendency of the conveyer chains to become disengaged from the guide blocks. Each of the guide blocks 30, 31 and 32 has the cross sectional form best shown in Figures 7, 10 and 14, which enables them to interlock with the conveyer chains in the manner shown in the drawings, the forward end of the head of the guide block 30 being beveled as best shown in Figures 1 and 2 so as to facilitate the entry of the conveyer chain links into co-operative relation with it. The guide blocks 30 and 31 are connected by a flexible guide member consisting of a guide chain 46; and the guide blocks 31 and 32 are connected by a similar guide chain 47. These guide chains may be of the style shown in Figures 1 and 2 or of any other suitable construction. At its forward end, the guide chain 46 is directly connected to the guide block 30 by means of a rivet 48. At its rear end, the guide chain 46 is connected to the guide block 31 through the medium of links 50 connected at their rear ends by a pin 51 which passes through a slot 52 in a reduced portion of the guide block 31; said pin 51 being connected to one end of a coiled spring 54 located in a longitudinal hole 55 in the guide block 31 and connected at its other end to a pin 56 located in the guide block and extending through said hole. The chain 46 is thus arranged to serve as a flexible and extensible guide member between the guide blocks 30 and 31. The forward end of the guide chain 47 is directly connected to the guide block 31 in the same manner as that in which the guide chain 46 is connected to the guide block 30; and at its rear end the chain 47 is connected to the guide block 32 by an extensible connection similar to that provided between the guide chain 46 and the guide block 31. When the guide chains 46 and 47 are assembled in co-operative relation with the guide blocks 30, 31 and 32, the springs 54 are put under tension. Therefore, at all times during the yielding movement of the guide blocks 30, 31 and 32 and guide chains 46 and 47 said guide chains will be maintained taut. This will be obvious from Figure 5 in which various positions of the springs 34 and 36 are indicated by dotted lines and the consequent variations in the distances between the guide blocks is diagrammatically indicated.

It will be obvious that with the guiding means herein shown and described, the conveyer chains are continuously guided but in a manner which permits local yielding throughout that portion of their travel in which guiding is necessary. After a link of the conveyer chain has passed into engagement with the guide block 30 it is positively interlocked with the guiding means until said link leaves the guide block 32, thereby insuring that the conveyer chain will perform its proper function regardless of the strains which may be put upon it.

While we have shown and described in detail one embodiment of our invention, it will be understood that modification may be made therein and that we do not, therefore, intend to limit ourselves to such specific embodiment, but desire to be understood as covering our invention broadly in whatever form its principle may be embodied.

What we claim is:

1. In combination with a conveyer chain, a guide comprising yieldingly supported guide blocks, and a flexible guide member connecting said guide blocks.

2. In combination with a conveyer chain, a guide comprising yieldingly supported guide blocks, and a flexible and extensible guide member connecting said guide blocks.

3. In combination with a conveyer chain, a guide comprising yieldingly supported guide blocks interlocking with said chain, and a flexible guide member also interlocking with said chain and connecting said guide blocks.

4. In combination with a conveyer chain, a guide comprising yieldingly supported guide blocks interlocking with said chain, and a flexible and extensible guide member also interlocking with said chain and connecting said guide blocks.

5. In combination with a conveyer chain, a guide comprising yieldingly supported guide blocks, and a guide chain connecting said guide blocks.

6. In combination with a conveyer chain, a guide comprising yieldingly supported guide blocks, and a guide chain and an extensible element connecting said guide blocks.

7. In combination with a conveyer chain, a guide comprising yieldingly supported guide blocks interlocking with said chain, and a guide chain also interlocking with said conveyer chain and connecting said guide blocks.

8. In combination with a conveyer chain, a guide comprising yieldingly supported guide blocks interlocking with said conveyer chain, and a guide chain and extensible element also interlocking with said conveyer chain and connected to said guide blocks.

9. In combination with a conveyer chain, a guide comprising yieldingly supported guide blocks interlocking with said chain, a guide chain one end of which is attached to one of said guide blocks, and a spring through which the other end of said guide chain is attached to the other guide block.

10. In combination with a conveyer chain, a guide comprising guide blocks supported for yielding movement in a direction substantially parallel to the direction of movement of the conveyer chain, and a flexible and extensible guide member connecting said guide blocks.

11. In combination with a conveyer chain, a guide comprising guide blocks supported for yielding movement in a direction substantially parallel to the direction of movement of the conveyer chain, and a guiding chain and extensible element connecting said guide blocks.

12. In a sugar cane harvester, two conveyer chains arranged to engage one side of sugar cane stalks and a third conveyer chain arranged to engage the other side of the stalks, the stalks being thereby gripped between the conveyer chains, and a continuous yielding guide co-operating with each conveyer chain throughout the major portion of the distance through which said conveyer chains co-operate and grip the sugar cane stalks.

13. In a sugar cane harvester, two conveyer chains arranged to engage one side of sugar cane stalks and a third conveyer chain arranged to engage the other side of the stalks, the stalks being thereby gripped between the conveyer chains, and a continuous yielding guide for each conveyer chain comprising yieldingly supported guide blocks interlocking with the conveyer chain and a guide chain also interlocking with said conveyer chain and connecting said blocks.

14. A conveyer chain composed of links provided with backwardly extending portions having inwardly projecting ears.

15. A conveyer chain composed of inner and outer links provided with backwardly extending portions having inwardly projecting ears, the outer links being provided with inwardly extending lugs the inner surfaces of which lie substantially in the plane of the inner surfaces of the inner links.

16. In combination, a conveyer chain, a long flexible guide therefor, and means holding the guide taut.

17. In combination, a conveyer chain, an extensible guide therefor, and means tensioning and yieldingly supporting the guide.

18. In combination, a converter chain, a long flexible guide therefor, and means yieldingly supporting the guide at intervals.

In testimony whereof we have affixed our signatures to this specification.

FREDERICK C. DOUGLAS WILKES.
FRANCIS K. FLYNN.